United States Patent
Aktas

(10) Patent No.: US 10,076,867 B2
(45) Date of Patent: *Sep. 18, 2018

(54) METHOD AND DEVICE FOR THE PRODUCTION OF AN OPTIMIZED BOTTOM CONTOUR ON PREFORMS

(71) Applicant: Mahir Aktas, Balcova Izmir (TR)

(72) Inventor: Mahir Aktas, Balcova Izmir (TR)

(*) Notice: Subject to any disclaimer, the term of this patent is extended or adjusted under 35 U.S.C. 154(b) by 245 days.

This patent is subject to a terminal disclaimer.

(21) Appl. No.: 14/902,291

(22) PCT Filed: Jun. 30, 2014

(86) PCT No.: PCT/DE2014/000335
§ 371 (c)(1),
(2) Date: Dec. 30, 2015

(87) PCT Pub. No.: WO2015/000459
PCT Pub. Date: Jan. 8, 2015

(65) Prior Publication Data
US 2016/0368198 A1 Dec. 22, 2016

(30) Foreign Application Priority Data
Jul. 1, 2013 (DE) .................. 10 2013 011 315

(51) Int. Cl.
*B29C 59/02* (2006.01)
*B29C 49/42* (2006.01)
(Continued)

(52) U.S. Cl.
CPC ............ *B29C 59/022* (2013.01); *B29B 11/08* (2013.01); *B29C 49/06* (2013.01); *B29C 49/062* (2013.01);
(Continued)

(58) Field of Classification Search
CPC .......... B29B 11/08; B29B 2911/14013; B29B 2911/14326; B29B 2911/14486;
(Continued)

(56) References Cited

U.S. PATENT DOCUMENTS 9,415,531 B2 * 8/2016 Aktas ................. B29C 45/7207
2006/0138696 A1 * 6/2006 Weinmann .......... B29C 45/7207
264/237
(Continued)

FOREIGN PATENT DOCUMENTS

EP 0322651 A 7/1989
JP S56209533 A1 12/1983
(Continued)

*Primary Examiner* — Matthew J Daniels
*Assistant Examiner* — Yunju Kim
(74) *Attorney, Agent, or Firm* — Lucas & Mercanti, LLP; Klaus P. Stoffel

(57) ABSTRACT

A device and a method for producing a preform having a shoulder and base geometry optimized for subsequent stretch blow molding, since the preform cannot be produced according to the conventional injection-molding method. For this purpose, the preform produced in the injection-molding tool is transferred into a conditioning station and is conditioned and cooled in the shaft while no contact is made with the top of the preform and the preform shoulder on account of a special contour of the conditioning receptacle. Due to the reheating of these preform regions they can be mechanically deformed into a new geometry which is advantageous for the blow molding process and thus their wall thickness can also be influenced. In the subsequent blow molding process the deformed preform has the advantage that the plastic material which is distributed better in the bottle results in considerable material savings and higher quality bottles.

9 Claims, 13 Drawing Sheets

(51) Int. Cl.
*B29C 49/06* (2006.01)
*B29B 11/08* (2006.01)
*B29C 49/64* (2006.01)
B29K 105/00 (2006.01)
B29K 67/00 (2006.01)
B29L 31/00 (2006.01)

(52) U.S. Cl.
CPC ...... *B29C 49/4242* (2013.01); *B29C 49/4252* (2013.01); *B29C 49/6427* (2013.01); *B29B 2911/14013* (2013.01); *B29B 2911/14326* (2013.01); *B29B 2911/14486* (2013.01); *B29K 2067/003* (2013.01); *B29K 2105/253* (2013.01); *B29L 2031/7158* (2013.01)

(58) Field of Classification Search
CPC ... B29C 49/06; B29C 49/062; B29C 49/4242; B29C 49/4252; B29C 49/6427; B29C 59/022; B29C 45/38; B29C 71/00; B29C 49/68; B29C 49/64; B29C 49/6436; B29C 49/6445; B29C 49/6454; B29K 2067/003; B29K 2105/253; B29L 2031/7158
USPC .................................... 264/101, 537, 237
See application file for complete search history.

(56) References Cited

U.S. PATENT DOCUMENTS

| 2012/0193838 A1 | 8/2012 | Bock et al. |
| 2013/0244050 A1 | 9/2013 | Witz |
| 2015/0021827 A1 | 1/2015 | Aktas |

FOREIGN PATENT DOCUMENTS

| WO | 2008041186 A2 | 4/2008 |
| WO | 2010149522 A1 | 12/2010 |
| WO | 2012075578 A | 6/2012 |
| WO | 2013123931 A1 | 8/2013 |

* cited by examiner

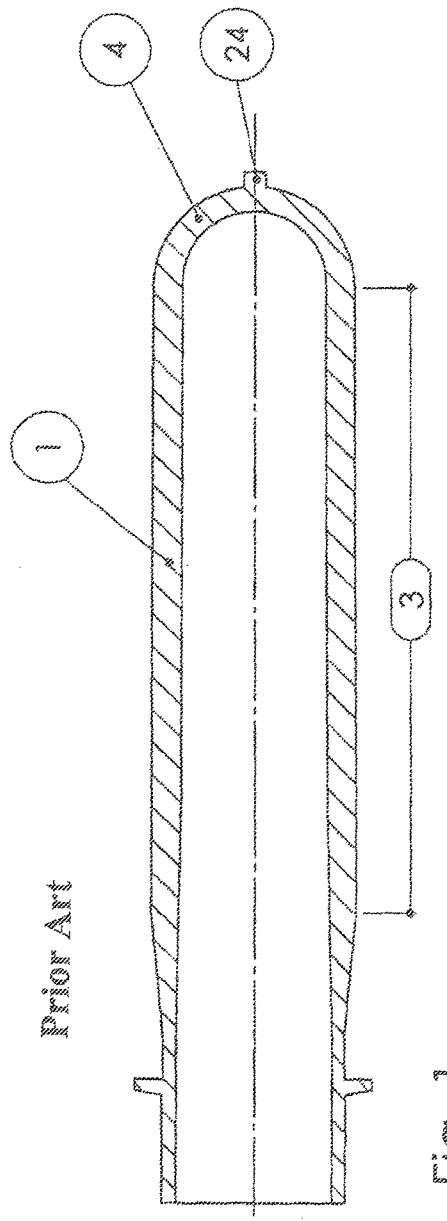
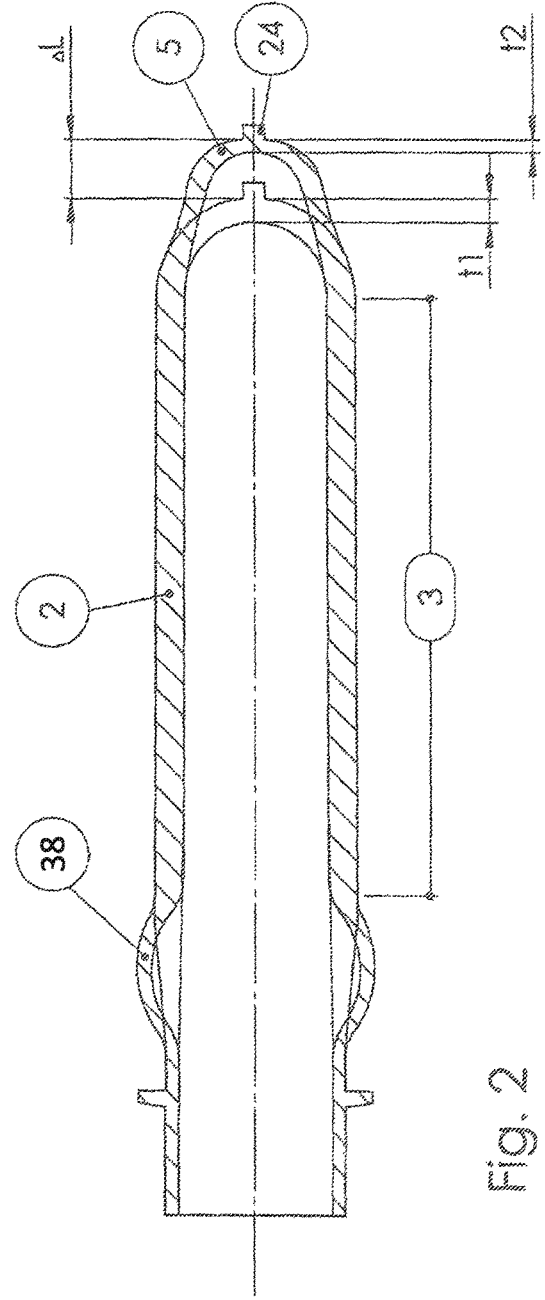
Fig. 1 Prior Art
Fig. 2

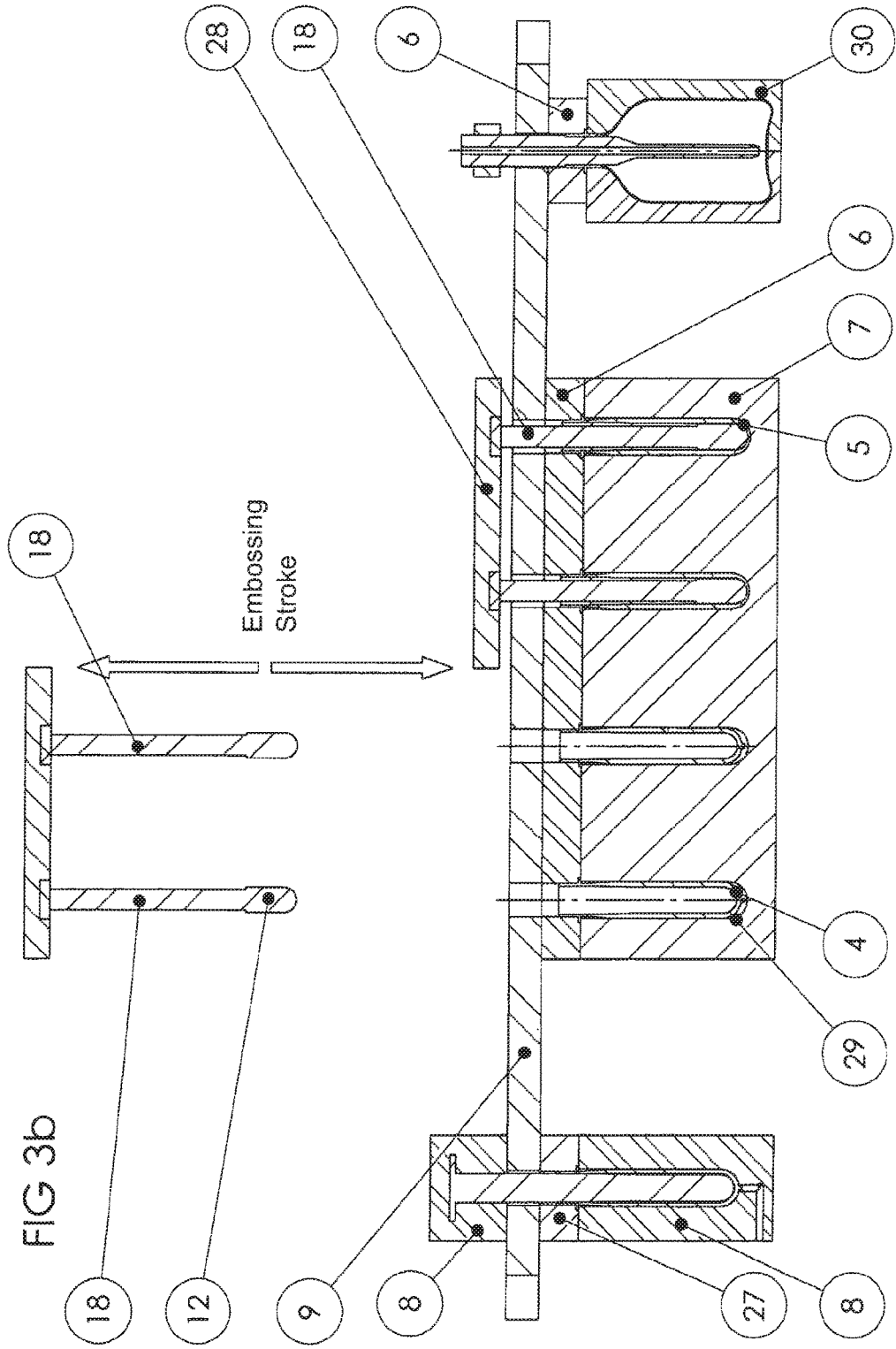

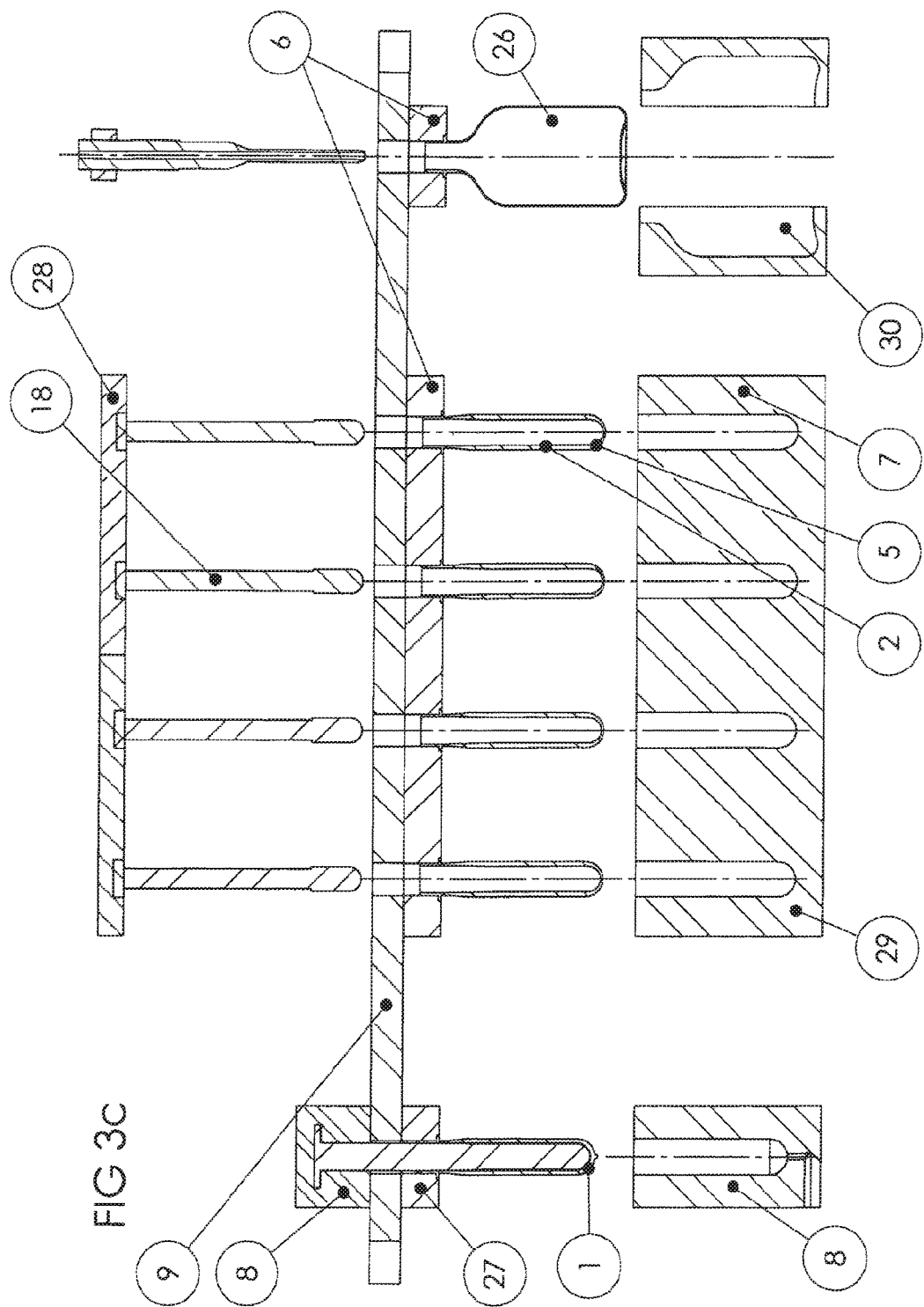

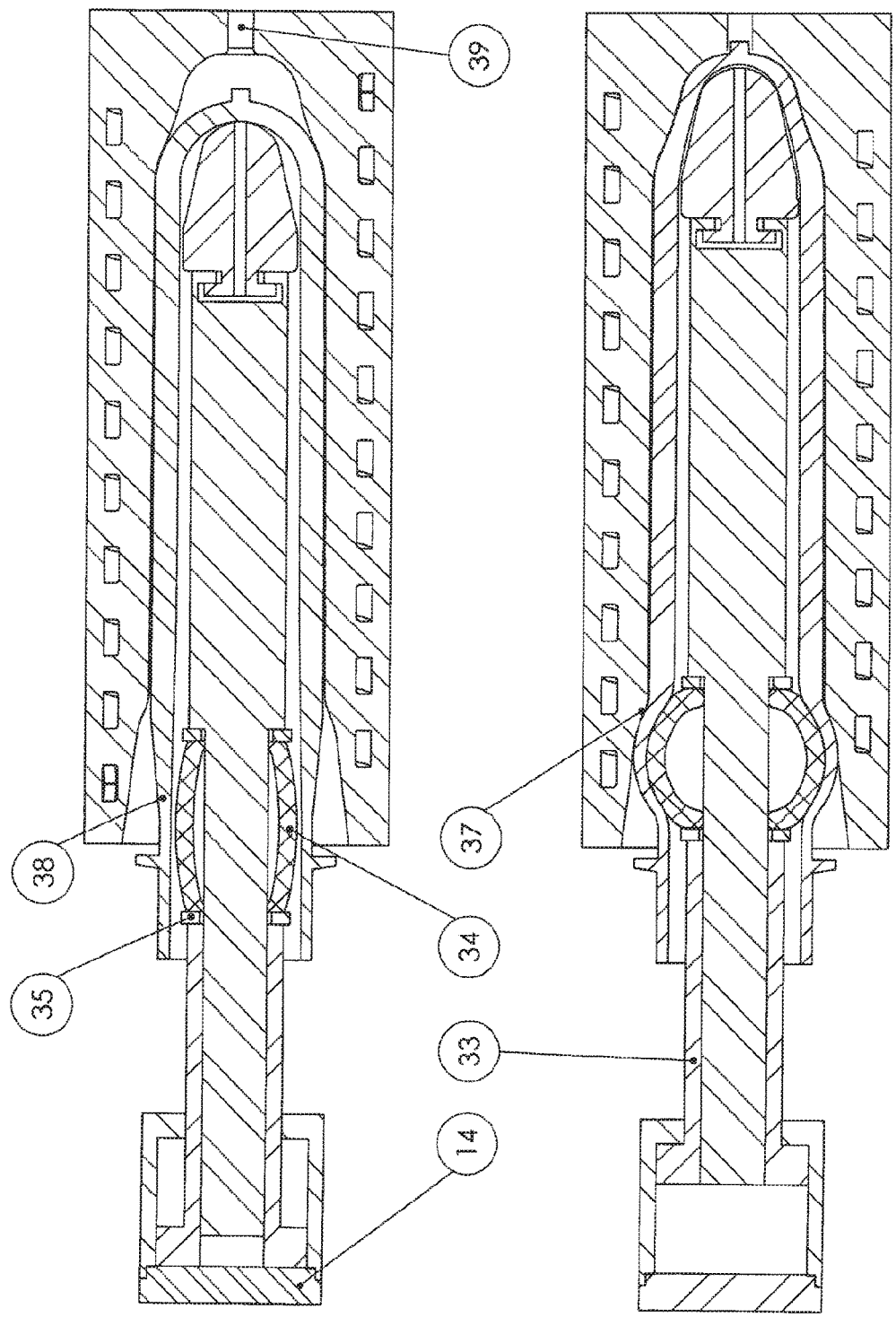

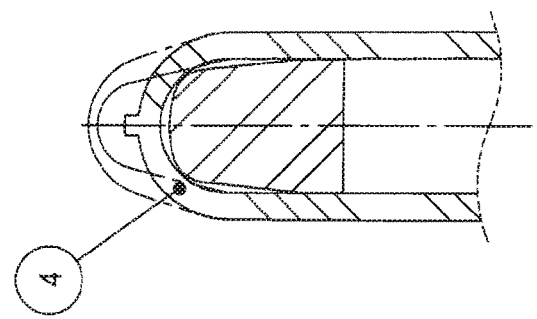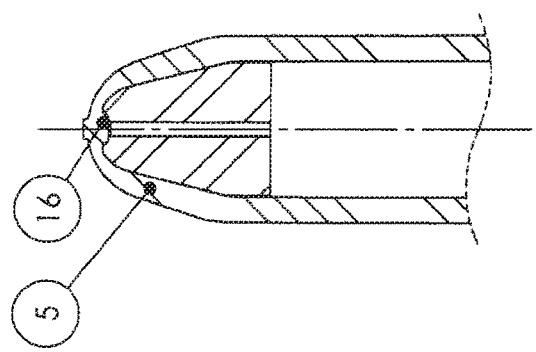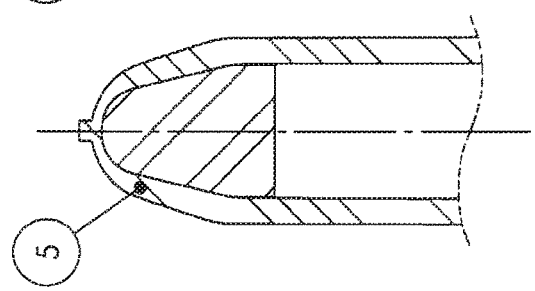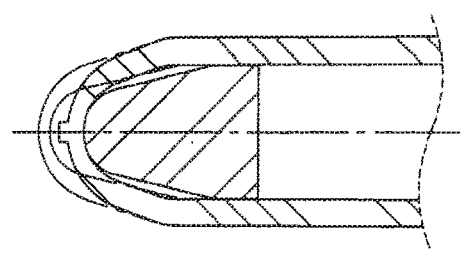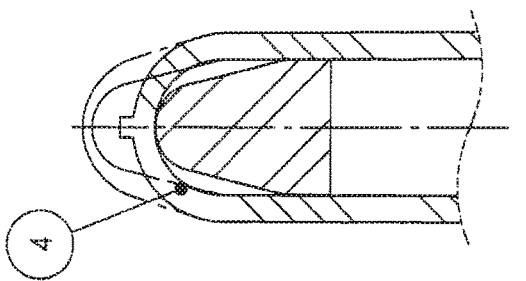

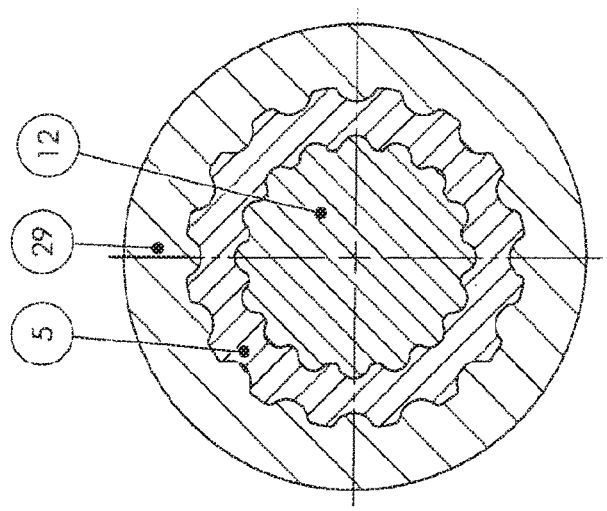
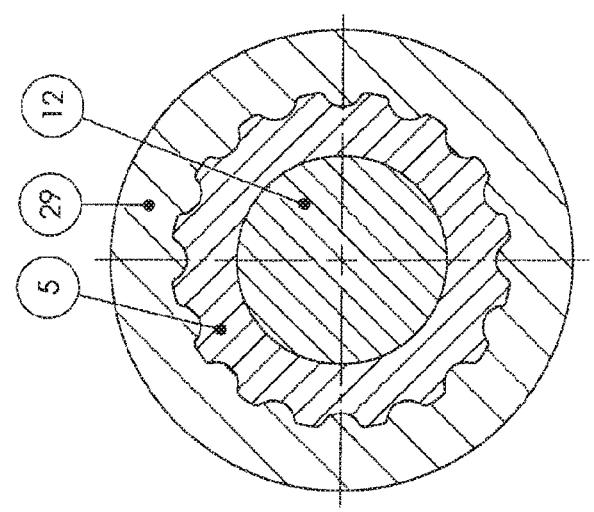
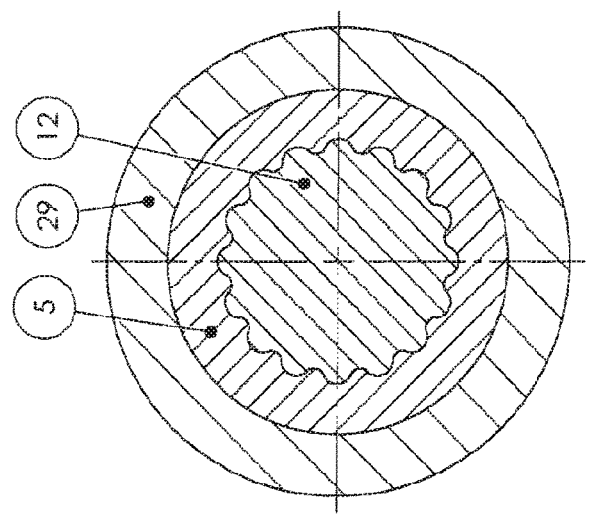
FIG 7a

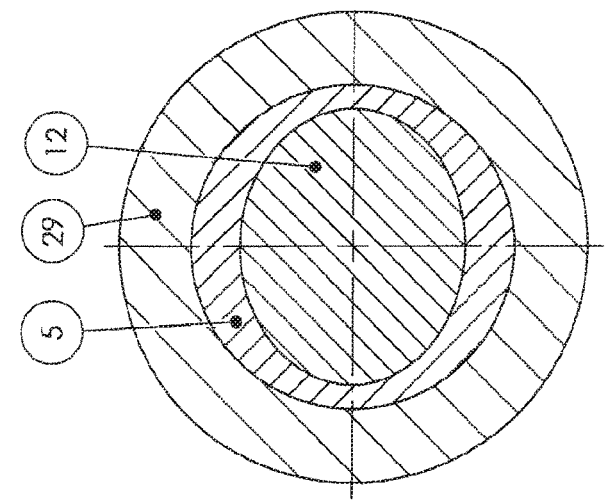
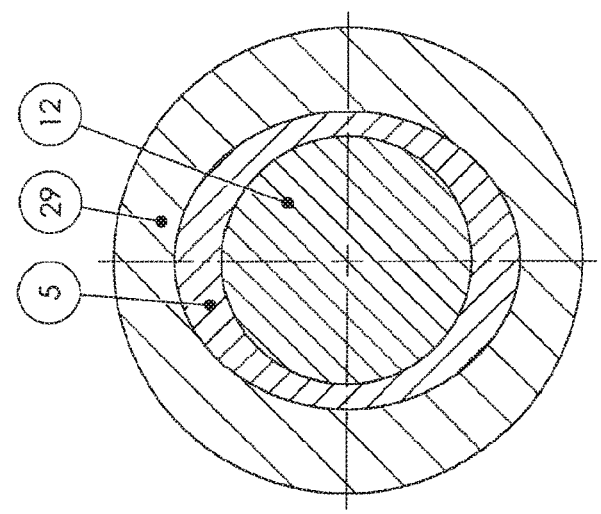
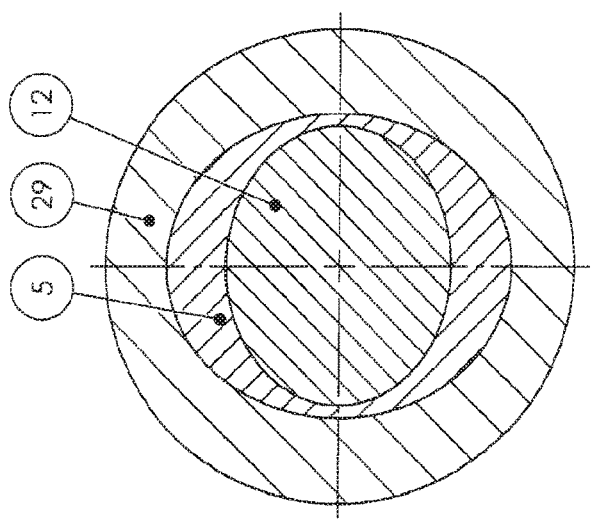
FIG 7b

METHOD AND DEVICE FOR THE PRODUCTION OF AN OPTIMIZED BOTTOM CONTOUR ON PREFORMS

TITLE OF THE INVENTION

The present application is a 371 of International application PCT/DE2014/000335, filed Jun. 30, 2014, which claims priority of DE 10 2013 011 315.6, filed Jul. 1, 2013, the priority of these applications is hereby claimed and these applications are incorporated herein by reference.

BACKGROUND OF THE INVENTION

The present invention relates to a method and a device for producing preforms for molding an advantageous base and shoulder geometry for the subsequent blow-molding process in first heat or second heat.

Preforms are primary products within PET bottle production which are either stretch-blow-molded to form PET bottles in the still hot state immediately after production in an integrated method (single-stage process) or are stretch-blow-molded to form PET bottles in a second process stage after cooling down from the production process in a two-stage process.

For the customary production of preforms described in this invention, polymer raw material is plasticized and subsequently forced at high pressure into a single- or multi-cavity mold.

This produces preforms according to FIG. 1, which geometrically consist substantially of a neck and shaft region and a domed base end and are hollow on the inside due to the insertion of a core in the mold. The neck region is shaped in such a way that it may be configured for example so as to be re-closable with a screw cap. The neck region does not undergo any further change during the blow-molding process, however. By contrast, the shaft region and the domed base end are inflated at elevated temperatures to form hollow bodies, whereby the polymer is stretched and at the same time considerably solidified. Therefore, in conjunction with the core geometry, the preform regions to be deformed are geometrically responsible for the bottle quality that is subsequently obtained.

In the single-stage process illustrated here by way of example, an injection mold and a subsequent blow mold are conventionally used. Since the injection-molding operation lasts much longer than the blow-molding operation, there are system solutions in which the number of injection-molding cavities is a multiple of the blow-molding cavities.

The injection-molded preform, the outer skin of which is in direct contact with the intensively cooled steel of the mold, consequently solidifies quickly there and can thus be demolded without any damage and without mechanical deformation. By virtue of the considerable residual heat inside the preform wall, which results in re-heating and associated re-softening without any further use of thermal energy in the single-stage process, the preform can be inflated to form the hollow body in the next production step. However, it is very difficult to give the preform a thermal profile that is optimal for stretch blow-molding—unless the single-stage injection stretch-blow-molding machine is equipped with an additional station with IR heaters or a conditioning station, which can have an influence on the thermal profile. However, even then, the thermal profile—particularly in the base and shoulder region—is still not yet optimal. On the finished hollow body, the base and the shoulder frequently have excessive material accumulations.

In the two-stage process, although the preform is reheated in a targeted manner, it is not possible, using the current state of the art, to supply the base and shoulder part with sufficient thermal energy for an optimal blow-molding result. This can be explained primarily by the position of the shoulder and base heaters with respect to the IR heaters.

The preform, as illustrated in FIG. 1, corresponds to the current state of the art, in which it is inevitable that the wall thicknesses of the preform have similar wall thicknesses, particularly in the region of the domed base end and the shaft. If the material sets prematurely on account of thinner wall thicknesses in the gating region, shrinking in the cooling phase on account of follow-up pressure on the melt cannot be avoided, with an effect on the entire preform including the neck region, this consequently leading to undesired sink marks in critical regions of the preform. For this reason, the preform geometry, as shown in FIG. 2 and the advantages of which will be explained below, cannot be produced by the known injection-molding process. The wall thickness is much thinner in the region of the shoulder, but especially in the domed preform end located in the vicinity of the gate, than in the further progression of the preform shaft, and consequently premature setting of this thin region is unavoidable.

SUMMARY OF THE INVENTION

The central problem that is addressed by the present invention is that of describing a method and a device with which preforms with much more favorable shoulder and base contours, which are advantageous for the subsequent stretch blow-molding, can be produced and the solution to which is described in the application.

A re-shaping of the preform base and shoulder contour allows the surface area thereof in these regions to be enlarged. This already has advantages, since the infrared heaters of the downstream blow-molding machines can introduce thermal energy more efficiently by way of this enlarged surface area and the stretching rod of the blow-molding machine can better influence the wall thickness of the finished bottle during the blow-molding process.

The advantages of an optimized base shape are described for example in WO 2008/041186 A2 and are known to those skilled in the art as the "Capello Design". Although it can be designed in any way desired, since the base contour described therein is already produced during the injection-molding process, the wall thickness can scarcely be influenced because of the physical properties described above.

However, the actual advantage for the subsequent inflation of the base of the bottle lies in a much thinner wall thickness of the domed preform end. This configuration is also described in the application WO 2010/149522 A1. It has been recognized that much thinner wall thicknesses than can be achieved by injection molding are advantageous in the region of the domed end of the preform. Here, the preform produced by the standard process is put under pressure with pressurized air in the downstream cooling sleeve. The cooling sleeve is in this case formed in such a way that the base region can still be inflated until the enlarged base contour brings an end to this deformation. This leads to the desired surface area enlargement, with at the same time a reduction in the wall thickness. This method is much better in terms of its result than the Capello Design, but the inflating operation can scarcely be controlled. Thus, inhomogeneous temperatures can have the effect that the gate deviates from the center. Moreover, the precise progression of the wall thickness in the region of the domed end is not predictable, but is subject to the thermal conditions that happen to occur around the domed preform end.

The mechanical shaping of preform domed ends has already been described in WO 2013/123931 A2. However, it is of great significance that re-shaping by embossing is likewise important and efficient in the shoulder region, too. In this connection, it should also be mentioned that a vacuum applied to the base of the cooling sleeve entails a considerable improvement in the embossing process in the preform base.

A physical basis of the invention can be seen in the fact that, in principle, the preforms removed from the mold re-soften, i.e. settle to a particular temperature level of around 90-130° C. and as a result become easily deformable again. After re-softening, the temperature profile of the preform can be optimized only with difficulty for any following blow-molding process by cooling or heating, and so the material frequently cannot be pulled uniformly, as desired, out of the base and the shoulder during this process step.

During the blow-molding process, which biaxially stretches the material, the polymer material has the property of solidifying on account of the stretching. Therefore, the material has the tendency, in principle, that the regions of the preform having the lowest degree of stretching and a high temperature level are most likely to yield under the blow-molding pressure and to be able to be shaped. As a result, the gating region in the subsequent bottle base and the shoulder region cannot be stretched fully, resulting locally in material accumulations. In most cases, these material accumulations lead to a thickening of the corresponding region of the bottle and even weaken it, since the less stretched material does not fully realize its possible solidification. It is appropriate to save on this material.

The saving can be achieved in that the preform base and the shoulder region are mechanically deformed in a targeted manner. To this end, the preform is kept in its blow-moldable temperature state in a downstream conditioning station, which, apart from the region of the domed end and the shoulder region, has the precise geometry of the preform, while it is intensively cooled there in the two-stage process. At the same time, by means of specially shaped embossing bodies, in combination with a special contour of the conditioning station in the region of the domed end and in the region of the shoulder, the preform can be deformed such that the critical regions become as thin as possible, while the wall thickness takes on the shaft thickness seamlessly in its further progression from the domed end and slowly loses wall thickness again at the shoulder. This avoids an abrupt change in wall thickness, which would have a lasting adverse effect during the blow-molding process of the bottle. Normally, it should be assumed that, during the embossing operation, the preform is subjected to an overall elongation by the embossing operation, it being necessary for this to be avoided since otherwise the entire preform shaft would also undergo a geometric change. Reproducible embossing is ensured in that the original progression of the domed end of the preform follows the internal geometry of the conditioning station for a short length before the optimized embossed geometry starts, such that a short supporting surface having an undercut of a few tenths of a millimeter arises for the preform. In this way, the preform is positioned reliably, with the result that the embossing forces cannot act on the entire preform shaft but only on that region of the domed end that is to be deformed.

The embossing body, produced from solid material, for example from Teflon or aluminum, for the preform base is designed such that, in the deforming operation, it preferably first contacts the gating point and only gradually deforms the entire region of the domed end in the further course of axial movement, always starting from the gate, likewise in an embossing manner. Depending on the diameter of the preform and the temperature of the domed preform end, axial embossing forces of 5 to 100 N are appropriate, but they may also be much higher. For example, an elliptical or conical embossing body could be ideal here for a spherical domed end contour of the preform. However, it is also conceivable to use plastically deformable embossing bodies, which may be produced for example from silicone. Such embossing bodies make it possible not to start the embossing operation directly at the gate, but at some other desired location within the domed end. On account of the elastic deformability of the embossing mandrel, the gating region would only be deformed later. It is advantageous in this case if, after the deforming operation, the base contour of the preform on the inside precisely replicates the embossing body and on the outside replicates the base geometry of the conditioning station. It is then possible to control the temperature of the domed preform end that is re-shaped after the embossing process, and is then likewise in intensive contact with the conditioning station, as desired.

The embossing work of the embossing operation in the domed preform end can be influenced by actively controlling the temperature of the embossing body. In this case, the embossing mandrel is preferably heated to between 90 and 130° C., but it can also be cooled if required. An increased vacuum in the cooling sleeve can provide further assistance for embossing, particularly in the base region.

A deformable material, which enlarges by compression and thus shapes the shoulder region, has in principle to be used for the shoulder region.

A preform with a described re-shaped base and shoulder offers great advantages for the subsequent stretch-blow-molding process. The gating point, which is contacted by a stretching rod during the blow-molding process and is thus cooled and also comes into contact with the cooling blow mold first as a result of the longitudinal stretching, can cool this region rapidly. As a result of this circumstance, the material in the base region, most particularly at the gate, cannot be satisfactorily stretched, with the result that most stretch-blow-molded plastic bottles have an unnecessary accumulation of material there, which may even lead to weakening of the base.

The newly formed domed preform end, which, as a result of the embossing operation, has much thinner preform wall thicknesses at and around the gating point for the following blow-molding process, can be inflated to form the hollow body with a specific material distribution in the base. Furthermore, the base region is additionally strengthened by the then possible higher degrees of stretching, with the result that the quality of the base of the bottle is much enhanced. In this case, it is advantageous for the embossed region in the further progression of the domed end to thicken to the seamless connection to the preform shaft. This also applies in equal measure to the shoulder region, which can then be stretched much better on account of the thinner wall and it is therefore likewise possible to save on material.

A further possibility is to shape the preform bases in molds that resemble the finished shape of the base of the bottle. Bottles may for example be oval, or the bases have feet, making it difficult for the material to be distributed uniformly in the base region during the stretch blow-molding. The shaping preparation of the preform bases allows a better material distribution to be achieved later. This shaping may be introduced at the embossing mandrel or in the cooling sleeve. It goes without saying that this may also take place at both locations simultaneously.

In principle, the embossing method has no influence on the production cycle time, since the time of the injection molding in the mold takes longer than the embossing operation.

The invention is explained in more detail below and with reference to the accompanying drawings, in which:

BRIEF DESCRIPTION OF THE DRAWING

FIG. 1 shows a preform in cross section with a round domed end as is usually produced according to the prior art.

FIG. 2 shows a preform in cross section with a base and shoulder geometry that has been shaped by an embossing operation after the injection-molding process in the post-cooling station and the wall thickness progression of which to the shoulder and to the gating point can be modified as desired.

FIG. 3b shows an example of the structure of a single-stage, rotary injection stretch-blow-molding production of PET hollow bodies with a conditioning station with closed molds during the injection-molding, embossing and conditioning process, and during the blow-molding and ejection process.

FIG. 3c shows an example of the structure of a single-stage, rotary injection stretch-blow-molding production of PET hollow bodies with a conditioning station before the rotational movement of the rotary plate.

FIG. 5c shows a schematic sectional view like 5a, but with the embossing force being built up pneumatically.

FIGS. 6a-c show the embossing sequence of the domed preform end by a geometrically predetermined embossing body and cooling sleeve.

FIG. 6d shows a geometrically predetermined embossing body in conjunction with a cooling sleeve, which allows an accumulation of material in the gating region.

FIG. 6e shows a geometrically predetermined embossing body in conjunction with a cooling sleeve of dimensionally flexible material, which assumes the desired contour during the embossing.

FIG. 7a shows a geometrically predetermined embossing body in conjunction with a cooling sleeve that have engravings and/or are by roughened for surface area enlargement.

FIG. 7b shows a geometrically predetermined embossing body in conjunction with a cooling sleeve that is geometrically made to match the shaped bottle base, such as oval in this example.

Figure 3A:
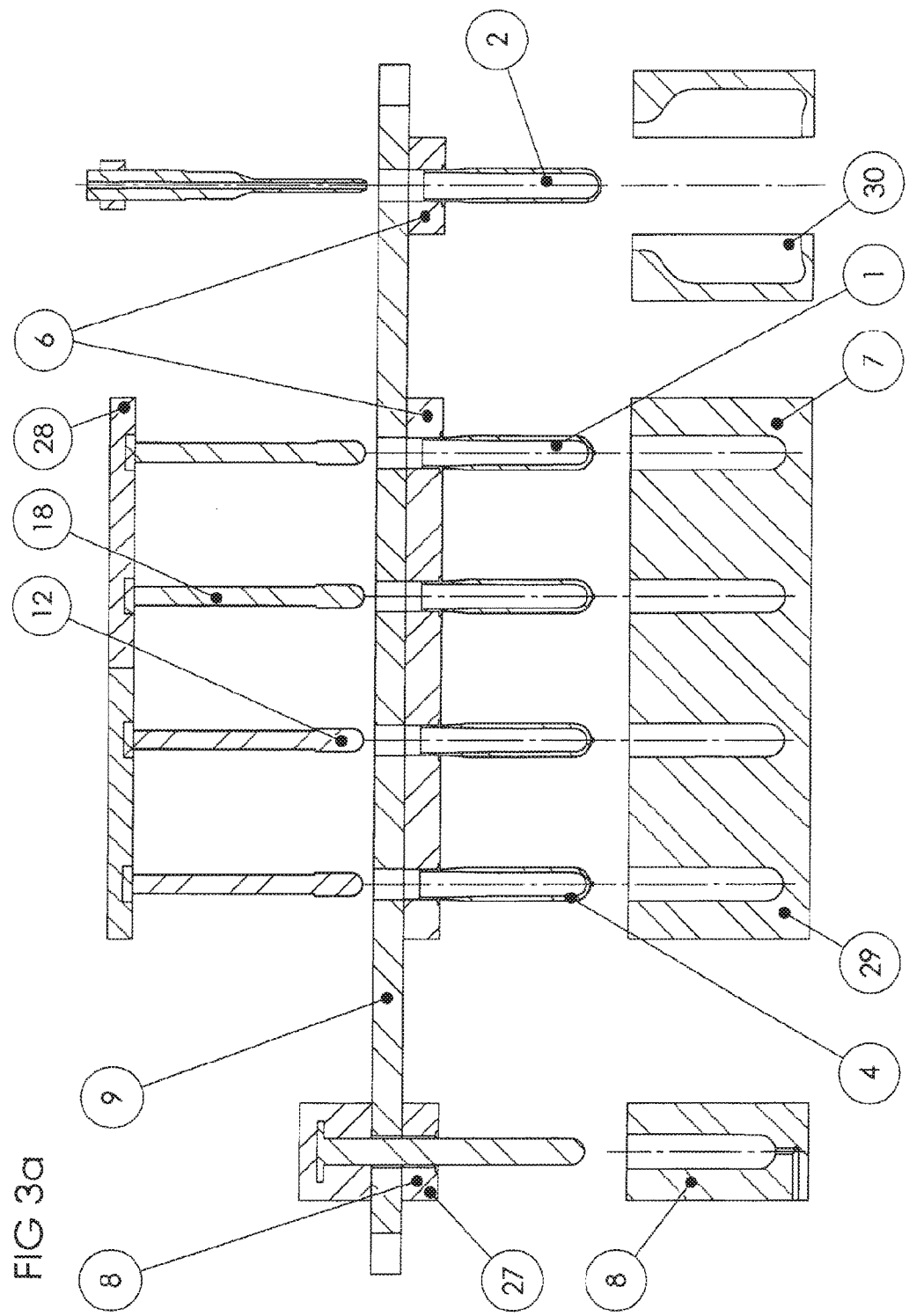
FIG. 3a shows an example of the structure of a single-stage, rotary injection stretch-blow-molding production of PET hollow bodies with a conditioning station following the rotational movement of the rotary plate.

The drawings are intended to assist the explanation that follows of the embossing operation of the domed preform end and of the shoulder. For these embodiments, the single-stage PET bottle production was used. In the two-stage process, the embossing process is identical to the greatest extent, apart from the preform transport and the fact that the cooling sleeve is not temperature-controlled but is intensively cooled.

DETAILED DESCRIPTION OF THE INVENTION

FIG. 1 shows a preform 1 produced according to the prior art, generally with a spherical domed end 4, which may also have other geometries, however. In this case, the wall thickness of the domed preform end 4 generally comprises about 80% of thewall thickness of the preform shaft 3. Preforms that are optimized for the blow-molding process, according to FIG. 2, with thinner wall thicknesses at the gate 24 and the shoulder 38, cannot be realized on account of the risk of the melt setting, since otherwise the follow-up pressure that counteracts the shrinking process of the preform during the cooling process can no longer act in the decisive thicker-walled regions, particularly at the neck.

In order to be able nevertheless to produce a preform 2 such as that shown in FIG. 2 by the conventional injection-molding technique, the preform 1 is first produced in the usual way in a mold 8 and transported to the conditioning and embossing station 7, for example by rotation, after the first cooling and opening of the mold. In single-stage systems, the rotary plate 9 can have transport bars 6 which are present once per station and are each equipped with shaping neck rings 27. The neck rings 27 are in principle part of the injection-mold 8, but are used as transport means to the other stations in the further progression of the process.

Both the injection-molding station 31 with the mold 8 and the transport bars 6 are sufficiently well known from the prior art.

In FIG. 3a, both the rotary plate 9 and the embossing unit 28 are illustrated in their top position. The plastic products have each been conveyed to the next station in each case by the rotational movement of the rotary plate 9. In this way, the preforms 1 which have just been injection-molded are now in the position of the conditioning station 7. The preforms produced first of all, according to FIG. 1, have a conventional shape with a relatively thick wall thickness in the domed base end 4 and the shoulder 38 and are freely suspended. The next processing step is illustrated in FIG. 3b, in which the rotary plate 9 is lowered into its bottom position. As a result, the injection-molding station 31 is closed and the injection-molding process can be initiated. In addition, by way of the same movement, the preforms 1 in the conditioning station 7 have been placed into conditioned receptacles 29, which are temperature-controlled for example by liquid. The embossing process can also be carried out there after a freely determinable time, in that the embossing unit 28 carries out an embossing stroke by moving down into the bottom position, during which the domed preform end 4 and/or the shoulder 38 are shaped. The blow-molding process takes place at the same time in the blow-molding station 30, while the finished hollow bodies are ejected in the ejection station 15.

Figure 3D:
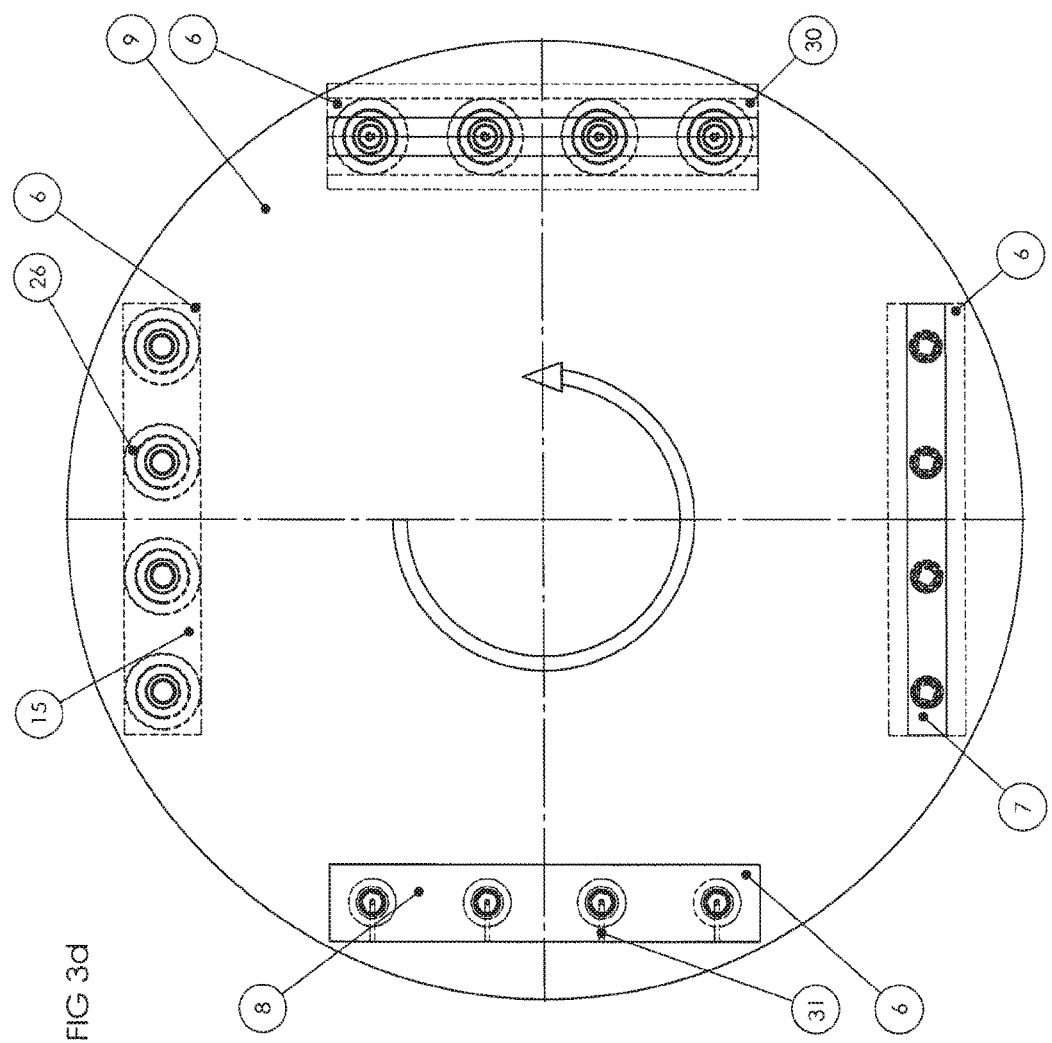
FIG. 3d shows a plan view of an example of the structure with a rotary plate and the four processing stations of injection-molding, conditioning and embossing, blow-molding and ejection.

In FIG. 3c, the rotary plate 9 is moved up again in order to be able to carry out the rotary onward transport of the plastic products, i.e. preforms 1, preforms 2 and hollow bodies 26, into the next station. In FIG. 3d, the rotary plate 9 and the processing stations 31, 7, 30 and 15 are illustrated in plan view. It goes without saying that such a single-stage machine can also make linear transport steps which are enabled for example by chains. This type of construction has the advantage that the machine is more compact, especially when a relatively large number of processing stations, for example one or more UV heaters, are additionally desired. For this invention, it is decisive in this case that the preform is optimized by embossing in at least one station between injection-molding 31 and blow-molding 30 in one station.

Figure 4A:
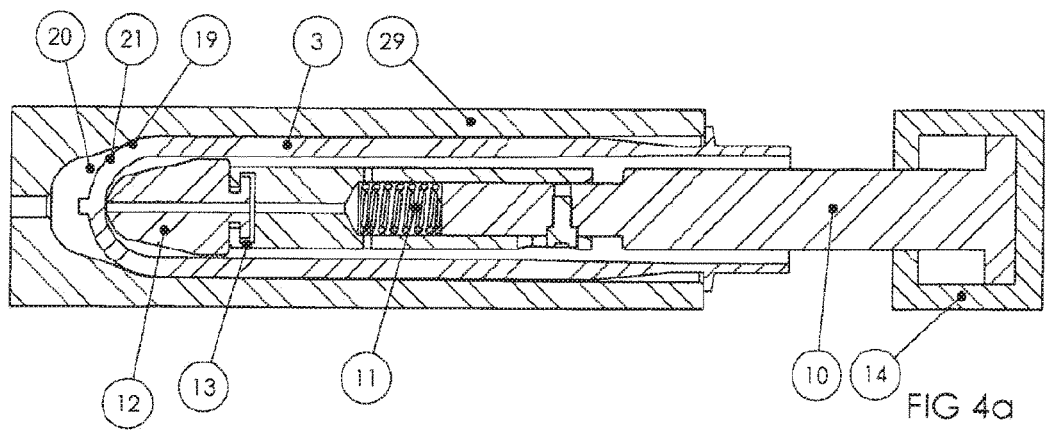
FIG. 4a shows a sectional view of an individual embossing device consisting of a cooling sleeve with an individual base contour, a preform before the embossing operation and an embossing body with floating mounting, which has been geometrically determined by the base contour of the cooling sleeve. The embossing mandrel is optionally axially driven individually for the embossing operation.
Figure 4B:
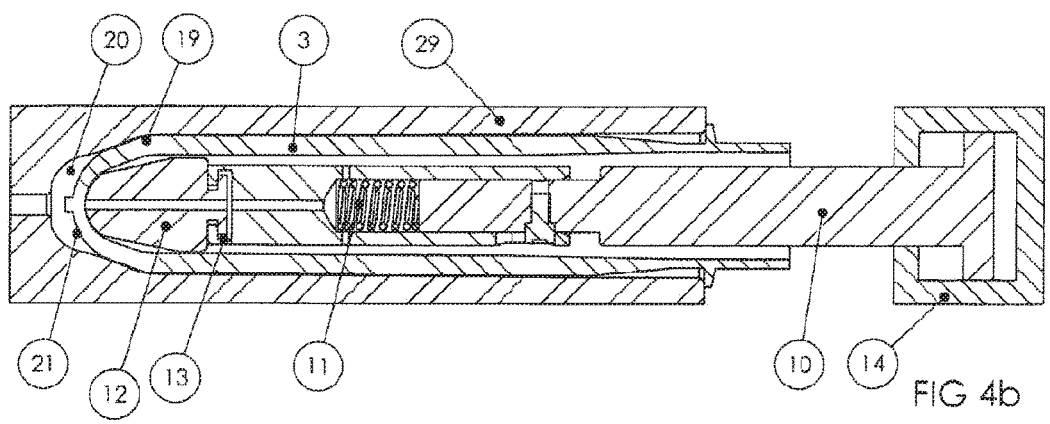
FIG. 4b shows a sectional view like 4a with the embossing operation initiated.
Figure 4C:
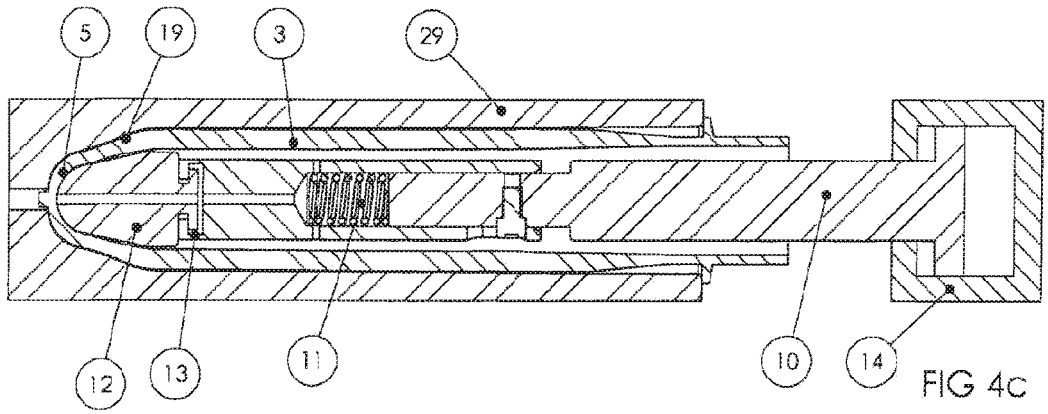
FIG. 4c shows a sectional view like 4a with the embossing operation completed.
Figure 5A:
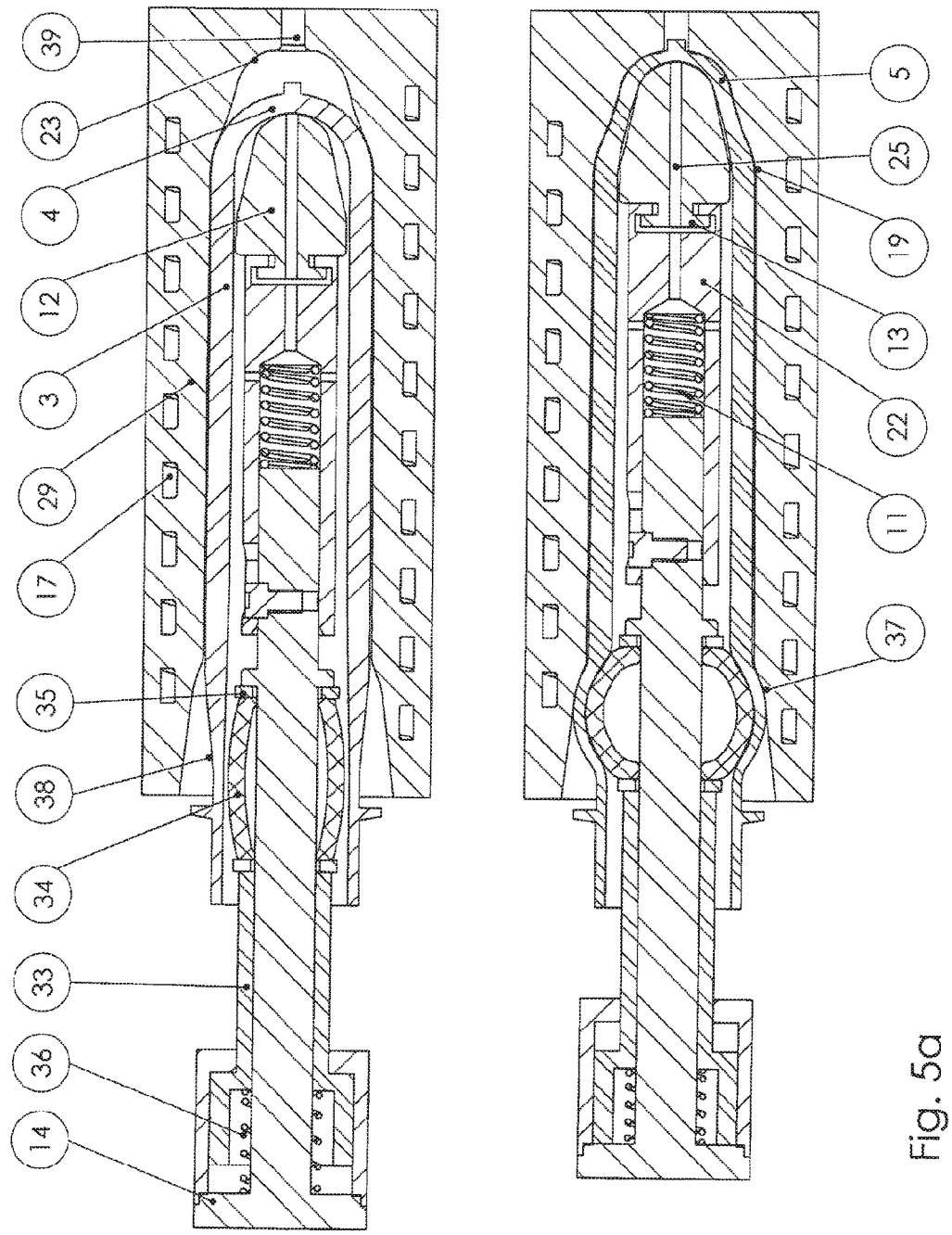
FIG. 5a shows a schematic sectional view of an embossing device for a drive for mechanically building up the embossing force with springs, consisting of a cooling sleeve with an enlarged cavity at the base and shoulder and an embossing mandrel, which together have the optimized geometry in the base region and at the shoulder.
Figure 5B:
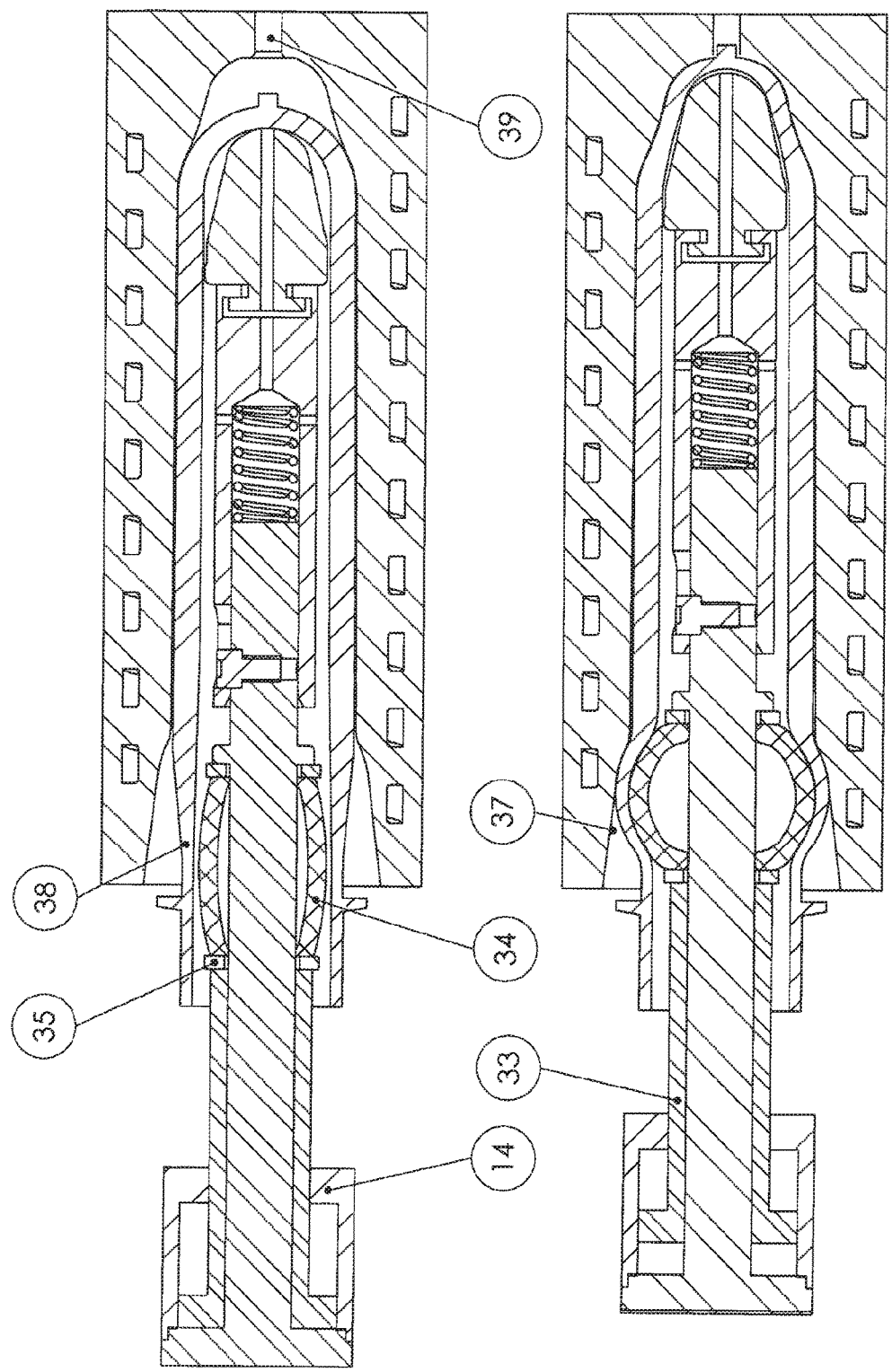
FIG. 5b shows a schematic sectional view like 5a, but with a hybrid (pneumatic and mechanical) drive for building up the embossing force.
Figure 5D:
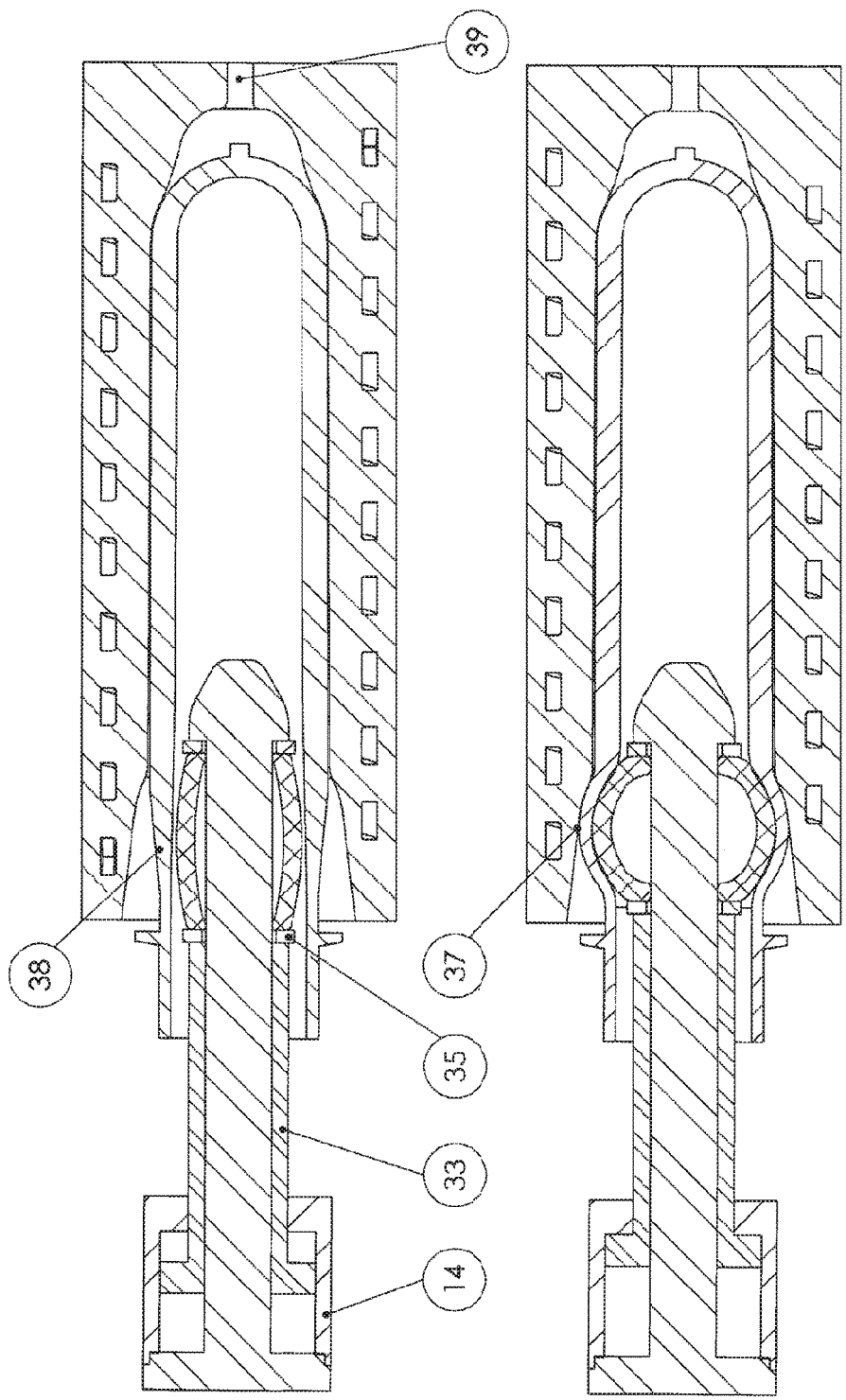
FIG. 5d shows a schematic sectional view like 5a, but only with shaping of the shoulder.

The preform positioning that is illustrated in FIG. 4a shows that the conditioning receptacle 29 has an enlarged geometry 20 in the base region, with the result that direct contact is prevented at the preform base 21. FIG. 5a additionally shows the recess for the preform shoulder 37. As a result, directly after the start of conditioning in the region of the preform shaft 3, the domed preform end 4 and the shoulder 38 are given time to thermally stabilize and thus to be able to re-soften.

In order to prepare the mold 8 as quickly as possible for the next injection-molding cycle, the preforms 1 are transported as quickly as possible to the conditioning station 7 by the transport bars 6 mounted in the rotary plate 9 by way of the movements of the rotary plate. In this case, they then take up a position in the conditioning receptacle 29 which allows the preform mouths to be axially aligned with the same number of embossing mandrels 18 which are mounted on the embossing unit 28. The embossing unit 28 has a separate vertical drive, which is not illustrated here. By way of the vertical embossing stroke, the embossing mandrels 18 are introduced into the preform mouths and can, when they have arrived at the preform base, bring the latter into their optimal shape, it being possible for this to be assisted by vacuum. In the same work step, the preform shoulder 38 can likewise be widened by an elastic embossing body 34. It goes without saying that each embossing mandrel 18 can also have an individual drive 14. The structure of the embossing mandrels is illustrated in FIGS. 4a-c and FIGS. 5a-c.

The embossing mandrels 18 consist substantially of a piston rod 10, a piston rod extension 22, which is sprung axially in relation to the piston rod by a compression spring 11, and an embossing body 12, which is mounted radially in a floating manner 13. The embossing body 12, at the front end of the embossing mandrel 18, may optionally be made of elastic or rigid material and optionally be temperature-controlled or water-cooled. In addition, the embossing body 12 ideally has a vent 25. For the embossing of the shoulder region, provision is made of an elastic embossing body 34 which is mounted in a floating manner by two washers 35. These washers are compressed by the piston 33 such that the elastic embossing body 34 expands. In order to be able to match the embossing forces to those of the embossing of the domed end, a further spring 36 can be used here if required.

The force and the point in time for the actual embossing stroke may be determined by a dedicated drive for the embossing unit 28 as a whole and by the design of the compression springs 11 and 36. The use of individual axial drives 14 may become appropriate when the embossing time is intended to be individually delayed. If all of the individual axial drives 14 introduce the same embossing force into the embossing operation, it is possible to dispense with the compression spring 11.

The preforms of FIG. 1 are borne by the inner contour of the conditioning receptacle 29 in such a way that, in spite of the enlarged base geometry 20, they are reproducibly positioned and axially fixed. This is achieved by the base geometry 20 of the conditioning receptacle 29 being designed in such a way that the domed preform end 4 reliably stands on a small circular-ring area of spherical shape 19, which forms an undercut. This area is designed such that the hot preform shaft 3 does not become wedged or elongated by the axial forces in the conditioning receptacle 29 during the embossing.

The embossing operation itself is illustrated in FIG. 5 and FIGS. 6a-c. Owing to the reproducible thermal profile in the domed preform end 4, with the highest temperature at the gating point 24, this temperature decreasing gradually toward the preform shaft, however, it may be appropriate first to apply the embossing body 12 there. However, there are also applications in which it makes more sense for a small accumulation of material to remain directly at the gating point 24, it being possible for this to be created for example by a hollow in the embossing body 16. Furthermore, it is also possible to use dimensionally flexible embossing bodies as in FIG. 6e, which then do not have to be applied directly to the gating point 24. On account of their deformability, it is only with the completion of the embossing operation that they assume their optimal shape in the gating region 24, with the result that more material can specifically remain there. These embossing operations, too, can optionally be assisted by an applied vacuum at the cooling sleeve base 39.

A further embodiment of the embossing unit according to FIGS. 7a and 7b may contain various types of grooves or engravings in the embossing body 12, or very particularly in the base of the conditioning receptacle 29, said grooves or engravings serving for additionally enlarging the surface area. A roughening of the surface additionally enhances this measure. A particular embodiment could be special geometries that assist the production of for example oval bottle bases or bottle bases with feet.

As a result of the described gradual further temperature progression of the domed preform end 4 in the direction of the preform shaft 3, during the embossing operation the material yields increasingly less readily, with the result that the wall thickness there is likewise gradually reduced increasingly less. This effect can be further enhanced by a convex base contour 23, since the material in a plastic state rolls there from the preform shaft 3 to the gating point 24 over the intensively cooled surface during the embossing, and consequently the effect of the gradually decreasing wall thickness progression is additionally enhanced. This effect is desired for the subsequent blow-molding process, which biaxially stretches the preform body. This stretching operation can no longer be influenced particularly in the gating region, with the result that there is a considerable material accumulation there.

This is brought about by the contact of the stretching rod with the preform in the blow-molding station and the hollow body geometry. The preceding embossing operation, which already stretches the base in advance and thus reduces the wall thickness to for example half the previous wall thickness, avoids such material accumulations to a significant extent.

The domed preform end 5 that has then been optimized by mechanical embossing is likewise brought to the optimal temperature for the blow-molding process, particularly in the previously hottest region, the gating point 24, as a result of the then smaller wall thickness and the increased surface area. The shoulder, which then has a thinner wall, also profits from the same effect.

Once the embossing operation has been completed, the embossing mandrels 18 can be moved up again at any time, at a time that is appropriate depending on the process. Depending on the type of construction of the machine, the preforms 2 that are then optimized with thin-walled bases and shoulders can be transported into the next station, where—as in the example here—they are inflated to form hollow bodies or can undergo an additional heating process. It goes without saying that, in the single-stage process, the embossing operation can also be carried out only in the station directly before the blow-molding process.

LIST OF REFERENCE SIGNS

1 Preform according to the prior art
2 Preform with optimized, thin-walled base
3 Preform shaft
4 Domed preform end according to the prior art
5 Domed preform end optimized by embossing
6 Transport bar
7 Conditioning station
8 Mold
9 Rotary plate
10 Piston rod
11 Compression spring
12 Embossing body
13 Radially floating mounting of the embossing body
14 Individual drive of the embossing mandrel
15 Ejection station
16 Hollow on the embossing body
17 Liquid temperature control
18 Embossing mandrel
19 Base contour with supporting circular ring of spherical shape
20 Enlarged cooling sleeve geometry
21 Base area without cooling contact
22 Piston rod extension
23 Convex base contour
24 Gating point
25 Vent
26 Hollow body
27 Neck ring
28 Embossing unit
29 Conditioning receptacle
30 Blow-molding station
31 Injection-molding station
32 Shoulder optimized by embossing
33 Pressure piston for elastic embossing body
34 Elastic embossing body
35 Retaining washer
36 Spring for deformation body
37 Recess with deformation contour for the preform shoulder
38 Preform shoulder
39 Applied vacuum at the cooling sleeve base

The invention claimed is:

1. A method for producing a preform with an base and shoulder geometry comprising:
   injection molding a polymer preform with a shoulder and a domed preform end in a mold;
   opening the mold after solidifying of an outer skin of the preform;
   taking the preform from the open mold using a transport device;
   inserting the preform into a conditioning station that contacts the wall of the preform and sets the preform at a temperature but does not contact the preform at the domed preform end or the shoulder; and
   performing an embossing operation by mechanically deforming the shoulder and domed preform end into contact with the conditioning station with an embossing body such that the preform replicates a contour of the conditioning station.

2. The method as claimed in claim 1, wherein the domed preform end and the preform shoulder undergo free resoftening because of the lack of contact with the conditioning station.

3. The method as claimed in claim 2, wherein a temperature range of between 90° and 150° is established in regions to be embossed.

4. The method as claimed in claim 1, wherein the embossing body is a geometrically determined embossing mandrel that in combination with an inner contour of the conditioning station deforms the polymer in a plastic state of regions to be embossed until a volume between the embossing mandrel and the inner contour of the conditioning station is substantially filled or completely filled with the polymer.

5. The method as claimed in claim 1, wherein, during the embossing operation, the preform is axially supported on a supporting ring and/or in a region of the domed end within a new base contour by a circular ring of a spherical shape.

6. The method as claimed in claim 1, wherein an embossing force is individually set for the shoulder and domed preform end of the preform by mechanical or pneumatic springs.

7. The method as claimed in claim 1, wherein the embossing bodies are temperature-controlled.

8. The method as claimed in claim 1, wherein embossing of the domed preform end is carried out independently of embossing of the shoulder.

9. The method as claimed in claim 1, wherein vacuum is applied to the domed preform end in the conditioning station to assist the embossing operation.

* * * * *